United States Patent [19]

Klein et al.

[11] 4,001,386

[45] Jan. 4, 1977

[54] PROCESS FOR H₂S REMOVAL EMPLOYING A REGENERABLE POLYALKANOLAMINE ADSORBENT

[75] Inventors: Johannes P. Klein, The Hague, Netherlands; Swethadrivas R. Setlur, New Delhi, India; Willem Groenendaal, The Hague, Netherlands

[73] Assignee: Shell Oil Company, Houston, Tex.

[22] Filed: Jan. 16, 1976

[21] Appl. No.: 649,956

Related U.S. Application Data

[63] Continuation of Ser. No. 465,445, April 29, 1974, abandoned.

[30] Foreign Application Priority Data

Mar. 1, 1973 United Kingdom ............ 9931/73

[52] U.S. Cl. ............................................ 423/574 L
[51] Int. Cl.² ...................................... C01B 17/00
[58] Field of Search .......... 423/228, 564, 570, 574, 423/576

[56] References Cited

UNITED STATES PATENTS

| | | | |
|---|---|---|---|
| 2,834,653 | 5/1958 | Fleming et al. | 423/576 |
| 3,752,877 | 8/1973 | Beavon | 423/564 X |
| 3,845,071 | 11/1974 | Groenendaal | 423/574 |
| 3,947,547 | 3/1976 | Groenendaal | 423/564 X |

*Primary Examiner*—G. O. Peters

[57] ABSTRACT

An improved process is described for reducing the total sulfur content of off-gases from a Claus process by catalytically converting the sulfur compounds contained in the off-gases to hydrogen sulfide and selectively absorbing the hydrogen sulfide with a regenerable polyalkanolamine adsorbent solution; the hydrogen sulfide enriched adsorbent being regenerated and used again for further adsorption of hydrogen sulfide and the hydrogen sulfide-rich gas mixture liberated in regeneration being passed to a Claus process. This improved process is characterized in that the hydrogen sulfide enriched polyalkanolamine solution from adsorption of the reduced Claus off-gases is further enriched in hydrogen sulfide content prior to regeneration by contacting it with a stream which contains hydrogen sulfide at a higher partial pressure than that of the reduced Claus off-gases.

6 Claims, 1 Drawing Figure

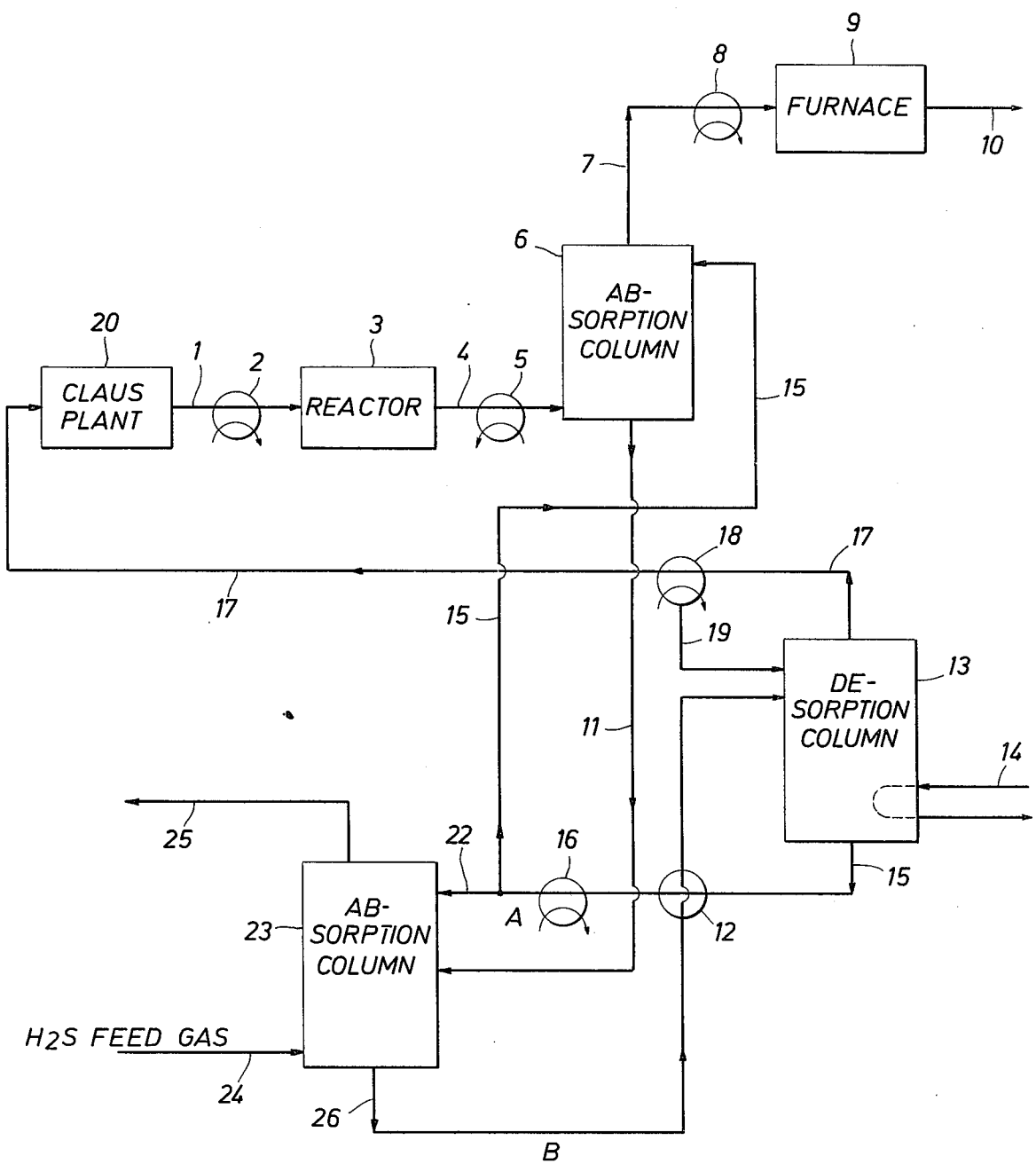

PROCESS FOR H₂S REMOVAL EMPLOYING A REGENERABLE POLYALKANOLAMINE ADSORBENT

This is a continuation of application Ser. No. 465,445, filed Apr. 29, 1974, now abandoned.

BACKGROUND OF THE INVENTION

The invention relates to a process for reducing the total sulfur content of Claus off-gases.

The process for the preparation of elemental sulfur from hydrogen sulfide by partial oxidation thereof by means of oxygen or an oxygen-containing gas such as air, followed by reaction of the sulfur dioxide formed from the hydrogen sulfide with the remaining part of the hydrogen sulfide in the presence of a catalyst is known as the Claus process. This process, which is frequently used both at refineries and for working-up hydrogen sulfide recovered from natural gas, is carried out in a Claus plant comprising a combustion chamber followed by one or more catalyst beds, one or more condensers being arranged in between in which the reaction products are cooled and the separated liquid elemental sulfur is recovered. The various process steps can be represented by the following reaction equations:

$$2H_2S + 3O_2 \rightarrow 2H_2O + 2SO_2 \qquad (1)$$

$$4H_2S + 2SO_2 \rightleftarrows 4H_2O + 6/_xS_x \qquad (2)$$

while the total reaction is represented by equation (3):

$$6H_2S + 3O_2 \rightleftarrows 6H_2O + 6/_xS_x \qquad (3)$$

For temperatures below 500° C the symbol $x$ in the above equation has a value of 8.

Since the yield of recovered elemental sulfur relative to the hydrogen sulfide introduced is not completely quantitative, a certain amount of unreacted hydrogen sulfide and sulfur dioxide remains in the Claus off-gases. These gases are normally incinerated in a furnace—which converts the hydrogen sulfide to sulfur dioxide—which is subsequently discharged to the atmosphere through a high stack. The amount of elemental sulfur recovered depends to some extent on the total number of catalyst beds used in the Claus process. In principle, 98% of sulfur can be recovered when three beds are used.

Viewed in the light of the increasingly stringent requirements in respect of air pollution abatement, incineration of Claus off-gases is no longer a satisfactory means of disposal. Moreover, it involves a certain loss in sulfur yield.

DESCRIPTION OF THE PRIOR ART

U.S. Pat. application Ser. No. 326,916 filed Jan. 26, 1973 (common assignee) describes a process for treating the off-gases from a Claus process which significantly reduces the sulfur content of such off-gases while at the same time substantially increasing the yield of recovered sulfur. This process, which is particularly suited for treatment of Claus off-gases having relatively high carbon dioxide contents, involves passing the off-gases from a Claus process at a temperature above 175° C, together with a hydrogen—and/or carbon monoxide-containing gas, over a sulfided Group VI and/or Group VIII metal catalyst supported on an inorganic oxidic carrier, then passing the off-gases thus treated through a liquid and regenerable polyalkanolamine absorbent for hydrogen sulfide and discharging the unabsorbed portion of the said off-gases, optionally after incineration, into the atmosphere, regenerating the hydrogen sulfide enriched absorbent by heating and/or stripping and using it again for further absorption of hydrogen sulfide and passing the hydrogen sulfide liberated in the regeneration to a Claus process.

Though the afore-described process is recognized as an excellent means of reducing the total sulfur content of Claus off-gases, there is still opportunity for optimization, especially in the regeneration phase of the process. Because the concentration of hydrogen sulfide in the reduced Claus off-gases is typically quite low and the pressure of these gases is about atmospheric, the polyalkanolamine absorbent used for removal of hydrogen sulfide from the Claus off-gases will always contain low concentrations of hydrogen sulfide. Further since the removal of hydrogen sulfide from the reduced Claus off-gases involves a selective adsorption of hydrogen sulfide into the polyalkanolamine absorbent, it is desirable to utilize an absorbent containing very little, if any, hydrogen sulfide. In other words, for optimum results the regeneration procedure should remove substantially all of the hydrogen sulfide absorbed in the hydrogen sulfide removal step. Accordingly, it can be seen that despite the low concentrations of hydrogen sulfide in the loaded absorbent utilized in removing hydrogen sulfide from the reduced Claus off-gases, the size of the unit for regeneration of this poorly loaded absorbent (usually a stripping column) must by necessity be of about the same size as that required for an absorbent which is highly loaded with hydrogen sulfide.

This problem of the need for an unduly large regeneration unit is in part overcome by a modified processing scheme disclosed in the aforementioned U.S. Patent application. In this modified scheme the above described process for removal of sulfur compounds from Claus off-gases is integrated with a process for recovering and concentrating the hydrogen sulfide feed stream to the Claus unit to the extent that a common absorbent solution is used to prepare the primary hydrogen sulfide feed stream to the Claus unit (by adsorption of hydrogen sulfide from other gaseous hydrogen sulfide-containing streams) and to remove hydrogen sulfide from the reduced Claus off-gases, both loaded absorbent streams being fed to a common regeneration unit. However, even this modified scheme is not considered optimum since the absorbent solution utilized to prepare the primary feed to the Claus unit which is usually highly loaded in hydrogen sulfide is diluted by the poorly loaded absorbent solution for removal of hydrogen sulfide from the reduced Claus off-gases with the net effect being that the regeneration unit must be sized to handle a volume of absorbent having an intermediate loading of hydrogen sulfide.

The present invention provides a process by which this drawback is substantially overcome in that the capacity of the absorbent to absorb hydrogen sulfide is more fully utilized and as a result the size of the unit for regeneration of the loaded absorbent may be appreciably reduced.

SUMMARY OF THE INVENTION

It has now been found that hydrogen sulfide sorption capacities of loaded polyalkanolamine absorbents emanating from the hydrogen sulfide adsorption step of the above-described process for removal of sulfur compounds from Claus off-gases can be more effectively and efficiently utilized and the size of the regeneration unit can be substantially reduced if the loaded absorbent is contacted with a stream which contains hydrogen sulfide at a higher partial pressure than that of the reduced Claus off-gases,—e.g., the primary hydrogen sulfide feed stream to the Claus unit—prior to regeneration. Accordingly, the invention is an improvement on the process for reducing the total sulfur content of Claus off-gases wherein said off-gases are passed at a temperature above 175° C, together with a hydrogen——and/or carbon monoxide-containing gas, over a sulfided Group VI and/or Group VIII metal catalyst supported on an inorganic oxidic carrier, after which the reduced Claus off-gases thus obtained are passed through a liquid and regenerable polyalkanolamine absorbent for hydrogen sulfide and the unabsorbed portion of the said reduced Claus off-gases, optionally after incineration, is discharged into the atmosphere the hydrogen sulfide enriched absorbent being regenerated and used again for further absorption of hydrogen sulfide and the hydrogen sulfide rich gas mixture liberated in the regeneration being passed to a Claus process. This improvement comprises increasing the hydrogen sulfide content of the hydrogen sulfide enriched polyalkanolamine absorbent by contacting it with a stream which contains hydrogen sulfide at a higher partial pressure than that of the said reduced Claus off-gases prior to regeneration of said hydrogen sulfide enriched absorbent.

THE DRAWING

The invention will be described in greater detail with reference to the accompanying drawing. This drawing which illustrates a flow scheme of an embodiment according to the process of the invention is intended to be illustrative rather than limiting on its scope.

DETAILED DESCRIPTION OF THE INVENTION

As indicated above the instant invention comprises an improvement on the basic process for reducing the total sulfur content of Claus off-gases described in U.S. Pat. application Ser. No. 326,916, filed Jan 26, 1973 (common assignee). In this basic process after heating to a temperature in excess of 175° C, the Claus off-gases, together with a hydrogen—or and/or carbon monoxide-containing gas, are passed over a sulfided Group VI/Group VIII metal catalyst in order to reduce sulfur dioxide to hydrogen sulfide. At the same time, elemental sulfur is converted to hydrogen sulfide. The reduction catalysts used may be catalysts containing molybdenum, tungsten and/or chromium as Group VI metal, and preferably a metal from the iron group, such as cobalt, nickel and/or iron as Group VIII metal. The inorganic oxidic carrier may be alumina, silica, magnesia, boria, thoria, zirconia or a mixture of two or more of these compounds. Suitable reduction catalysts are a $Ni/Mo/Al_2O_3$ or a $Co/Mo/Al_2O_3$ catalyst.

The treatment of the off-gases with a hydrogen—and/or carbon-monoxide-containing gas is preferably effected at a temperature in the range of from 180° to 350° C, and more preferably between 200° and 300° C. Although the pressure applied is mainly atmospheric, slightly elevated pressures may also be used, if desired. The gas hourly space velocity applied during the reduction is 500 to 10,000 normal liters (Nl) of Claus off-gases per liter of catalyst per hour.

The hydrogen—and/or carbon-monoxide-containing gas used may advantageously be a gas containing both compounds, such as town gas, water gas, synthesis gas, etc. Pure hydrogen or carbon monoxide may also be used.

Suitable hydrogen-rich gases or gas mixtures are the off-gas of a catalytic reforming unit, the gas produced in a hydrogen plant or the gas obtained from a processing unit for saturated crude gases from petroluem.

The hydrogen-containing gas preferably contains at least 20% by volume of $H_2$ or an equivalent amount of hydrogen and/or carbon monoxide. The hydrogen or the hydrogen-containing gas is used in such an amount that the ratio between hydrogen and sulfur dioxide is of from 3:1 to 15:1. This ratio is preferably of from 3.5:1 to 8:1.

The above ranges remain the same when reducing gas mixtures are used containing both hydrogen and carbon monoxide and when only carbon monoxide is used, since the carbon monoxide is equivalent to hydrogen. If elemental sulfur is also present in the Claus off-gases, the quantity of hydrogen and/or carbon monoxide required can also be calculated on elemental sulfur as the percentage of $SO_2$.

By using CO as reducing agent some carbonyl sulfide is also formed. If the presence of COS in the gas treated is undesirable, this carbonyl sulfide may, as is known, be decomposed by passing the said gas at elevated temperature over an alumina bed.

The liquid and regenerable hydrogen sulfide absorbent used is suitably an aqueous solution of a polyalkanolamine or a substituted polyalkanolamine or mixtures of such amines in aqueous solution. Absorbents of this type are well known in the art such as for example, dialkanolamines, trialkanolamines and dialkanolamines substituted on the amino nitrogen with alkyl groups. Examples of dialkanolamines are diethanolamine, di-n-propanolamine, n-propanolisopropanolamine and diisopropanolamine. Examples of trialkanolamine include triethanolamine and tri-n-propanolamine whereas the alkyl substituted amines are exemplified by methyldiethanolamine. Preferably the polyalkanolamine employed is diisopropanolamine or diethylamine or technical mixtures of such polyamines where the amines specified are the predominant component with minor amounts of mono—and tri substituted amines also being present. Aqueous solutions of polyalkanolamines which contain one or more neutral inorganic salts (e.g., sulfates, nitrates or chlorides of sodium or potassium) are very suitable.

The polyalkanolamines are preferably used in aqueous solutions in a molar concentration of 0.5 to 5 and preferably 1 to 3, relative to the said alkanolamines.

Absorption may be conducted in any suitable absorption device, e.g., a tray column containing valve trays, bubble cap trays or perforated plates. In treating Claus off-gases having a relatively high $CO_2$—content, it has been found desirable to effect absorption of the $H_2S$ in the reduced off-gases with an alkanolamine solution at a low temperature while using high gas velocities in order to increase the selectivity of the absorbent for hydrogen sulfide and thereby decrease the circulation rate of the solvent. In this embodiment absorption is preferably effected in an absorption column having at most 20 or, and preferably, less than 20 contacting trays. More preferably, the absorption column has 3 to 15 contacting trays. The gas velocity to be used suitably is at least 1 m/sec., and more preferably 2 to 4 m/sec. These gas velocities are based on the "active" or aerated tray surface. A low absorbent temperature enhances the selectivity of the hydrogen-sulfide/carbon-dioxide separation. The temperature is preferably lower than 40° C; most satisfactory results are obtained at temperatures in the range of from 5° C to 30° C. The Claus off-gases are contacted with the aqueous polyalkanolamine solution at atmospheric or substantially atmospheric pressure. Contacting is preferably effected by using the countercurrent principle.

In some instance the circulation rate of the solvent may be still further reduced by effecting the hydrogen sulfide removal for the greater part in the column with contacting trays and by removing the balance in venturi scrubbers with a relatively small amount of solvent which may have a different temperature, nature and composition.

After the absorption step, the unabsorbed part of the off-gases (which now consists mainly of nitrogen and carbon dioxide in addition to very small amounts of hydrogen and traces of hydrogen sulfide) is discharged into the atmosphere. If desired, this unabsorbed portion may also be incinerated in the usual manner before passing it to the stack.

The hydrogen sulfide loaded or enriched absorbent emanating from the reduced Claus off-gas absorption step generally contains about 0.5 to about 1.5% w hydrogen sulfide based on total solution weight. As indicated above, the improvement contemplated by the instant invention, in basic terms, involves increasing the hydrogen sulfide content of this loaded or enriched absorbent by contacting it with a stream which contains hydrogen sulfide at a higher partial pressure than that of the reduced Claus off-gases treated before the enriched absorbent is regenerated rather than passing the enriched absorbent directly to regeneration as was contemplated by the basic process.

Although the hydrogen sulfide enriched absorbent may be contacted with any stream from which $H_2S$ is to be removed and which contains $H_2S$ at a higher partial pressure than that of the said reduced Claus off-gases (which stream may be a liquid stream or a gas stream), it is preferred that such a stream (also referred to as the $H_2S$—feed stream) is the stream from which the $H_2S$ to be removed is to be used as the feed for a Claus plant. The hydrogen sulfide enriched absorbent may be used as the only absorbent for the $H_2S$—feed stream, but it is preferred that it forms only part of the absorbent used for this stream, the remainder of the absorbent for this $H_2S$—feed stream being the substantially $H_2S$—feed absorbent obtained after the regeneration step (also referred to as the lean absorbent). If desired the lean absorbent and the hydrogen sulfide enriched absorbent may be mixed before entering the apparatus wherein the $H_2S$ removal from the $H_2S$—feed stream is to take place. In general such an apparatus consists of an absorption column which contains several trays and in which absorbent and gas or liquid flow are countercurrent. It is preferred that the hydrogen sulfide enriched absorbent and the lean absorbent are introduced in such a column at different places, the latter at a place further removed from the inlet of the $H_2S$—feed stream than the former.

The loaded absorbent from the $H_2S$—feed stream contacting step is regenerated by heating and/or stripping which produces a hydrogen sulfide-enriched gas mixture and a regenerated absorbent which may be reused. Regeneration may be conveniently accomplished by passing the hydrogen sulfide-enriched absorbent solution to a regenerator at a temperature of preferably 80°–120° C. In this regenerator the absorbed components and any hydrolysis products formed are stripped by the steam which is generated in the boiling solution. Heating of the solution to be regenerated may very suitably be effected by means of indirect heating with low-pressure steam. It is also possible, however, to use direct injection of steam.

The hydrogen sulfide gas which is freed in the regeneration of the absorbent and which also contains carbon dioxide and water is first cooled in order to condense the water present therein. Normally, at least part of this water is recycled to the regeneration step in order to maintain the water content of the aqueous absorbent at the required level. After cooling, the hydrogen-sulfide rich gas is passed to a Claus plant to recover elemental sulfur from the gas.

Referring now to FIG. 1, designates a line through which the off-gases of a Claus plant 20 are supplied. These off-gases, which have a temperature of 150° C, are increased in temperature by means of a heat exchanger 2 and passed over a reduction catalyst at 225° C in a reactor 3. The hydrogen required for the reduction can be supplied to the catalyst bed separately or added direct to the Claus off-gases in the line 1. The reduced Claus off-gases leave the reactor 3 through a line 4 and are cooled in a heat exchanger 5. The off-gases enter an absorption column 6 at a temperature of 30° C which column contains a liquid and regenerable absorbent for hydrogen sulfide. If desired, a condenser may be inserted between the heat exchanger 5 and the absorption column 6 to remove any water present in the off-gases. The unabsorbed components of the off-gases, which consist mainly of $CO_2$ and nitrogen, are discharged through a line 7. In order to convert all traces of hydrocarbons and hydrogen sulfide, the remaining gas is heated in a heat exchanger 8 and incinerated at 400° C in a combustion furnace 9 before being discharged to the stack through a line 10.

An $H_2S$-riched absorbent is passed through a line 11 to an absorption column 23 to which an $H_2S$-feed gas stream is introduced through a line 24. A gas stream poor in hydrogen sulfide is discharged through a line 25 while the hydrogen sulfide enriched absorbent is discharged through a line 26 to the desorption column 13 for regeneration. The absorbent in column 13 is regenerated at elevated temperature by heating with steam supplied through a line 14. Since the regenerated absorbent is used at low temperature, it is heat-exchanged in a heat exchanger 12 with the absorbent to be regenerated and subsequently cooled in a cooler 16. The hydrogen sulfide-containing gas discharged through the line 17 is cooled in a cooler 18 in order to condense all water vapor entrained; the condensed water is returned to the desorption column through a line 19. The regenerated absorbent is discharged through a line 15 and subjected to heat-exchange in the heat exchanger 12 with the absorbent to be regenerated. Upstream of the cooler 16 the line 15 forks at A; a slip stream of the regenerated absorbent flows through the line 15 to the absorption column 6 wherein it is contacted with the reduced Claus off-gases. The main stream returns to the absorption column 23 through a line 22.

The hydrogen sulfide freed from the absorbent in the regeneration is cooled in the cooler 18 to remove the water and withdrawn via line 17 to the Claus plant diagrammatically represented by the numeral 20. The off-gases of this Claus plant are discharged through the line 1 and subsequently treated as described with reference to the Figure.

As indicated previously, the process according to the present invention is particularly suitable for the treatment of Claus off-gases which, in addition to hydrogen sulfide, have a high carbon dioxide content. The carbon dioxide content of these off-gases may exceed 5% by volume, for example 8–30% by volume, without causing technical difficulties or economic disadvantages in the operation of the process.

What is claimed is:

1. A process for reducing the total sulfur content of Claus off-gases comprising
    A. passing the off-gases from a Claus process at a temperature above 175° C, together with a hydrogen- and/or carbon monoxide-containing gas, over a sulfided Group VI and/or Group VIII metal catalyst supported on an inorganic oxidic carrier,
    B. passing the off-gases thus treated to an absorption step in which they are contacted with a liquid and regenerable polyalkanolamine absorbent for hydrogen sulfide, discharging the unabsorbed portion of the said off-gases, optionally after incineration, into the atmosphere, and producing a hydrogen sulfide-enriched polyaklanolamine absorbent emanating from the absorption step,
    C. increasing the hydrogen sulfide content of the hydrogen sulfide-enriched polyalkanolamine absorbent emanating from the absorption step by contacting said hydrogen sulfide-enriched absorbent with a stream which contains hydrogen sulfide at a higher partial pressure than that of the said reduced Claus off-gases,
    D. regenerating the hydrogen sulfide-enriched absorbent from step C by heating and/or stripping and using it again for further absorption of hydrogen sulfide, and
    E. passing the hydrogen sulfide liberated in the regeneration to a Claus process.

2. The process according to claim 1 wherein the stream which contans hydrogen sulfide at a higher partial pressure than that of said reduced Claus off-gases is a hydrogen sulfide-containing stream from which hydrogen sulfide is to be removed and used as the primary reactant feed for a Claus plant.

3. The process according to claim 2, wherein the hydrogen sulfide enriched polyalkanolamine absorbent forms only part of the source of polyalkanolamine absorbent used to absorb hydrogen sulfide from the stream containing hydrogen sulfide at a higher partial pressure than that of said reduced Claus off-gases.

4. The process according to claim 3 wherein the polyalkanolamine absorbent is selected from the class consisting of diethanolamine and diisopropanolamine.

5. The process according to claim 4 wherein the polyalkanolamine absorbent is diethanolamine.

6. The process according to claim 4, wherein the polyalkanolamine absorbent is diisopropanolamine.

* * * * *